United States Patent Office 3,598,854
Patented Aug. 10, 1971

3,598,854
ALKYLHYDROXYPHENYLTHIOLOALKANOATES
David Herbert Steinberg, Bronx, N.Y., assignor to
Geigy Chemical Corporation, Ardsley, N.Y.
No Drawing. Filed Oct. 31, 1968, Ser. No. 772,368
Int. Cl. B01j 1/16; C07c 153/07
U.S. Cl. 260—455                    8 Claims

ABSTRACT OF THE DISCLOSURE

Alkylhydroxyphenylthioloacyl alkanoic acid esters of mono- and polymercaptoalkanoic acid esters prepared by known thiolo esterification procedures, are stabilizers of organic material subject to oxidative deterioration.

---

This invention relates to alkylhydroxyphenylthioloacyl alkanoic acid esters of mono- and polymercapto alkanoic acid esters compositions otherwise subject to oxidative deterioration stabilized by the incorporation therein of such thiolo esters.

In particular the present invention pertains to compounds of Formula I:

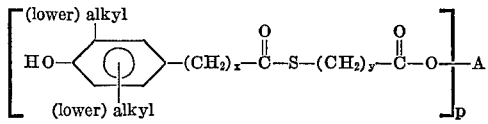

wherein $x$ has a value of from 0 to 6; preferably 2
$y$ has a value of from 1 to 6; preferably 2
$p$ has a value of from 1 to 4, preferably 2 to 4
A is an alkyl or an alkylene group having from
  1 to about 12 carbon atoms, preferably 2 to 6.

By the term "alkyl" and "alkylene," is intended a group containing a branched or straight chain hydrocarbon having 1 to 12 carbon atoms. Representative of such alkyl groups are thus methyl, ethyl, propyl, isopropyl, butyl, t-butyl, octyl, decyl, dodecyl and the like and the corresponding alkylene groups. When the term "alkyl" is herein qualified by the designation "(lower)," there is intended a branched or straight chain hydrocarbon of from 1 to about 6 carbon atoms.

It will be observed in Formula I that the alkanoyl portion of these thiolesters bears a di(lower)alkyl-p-phenolic group. This phenolic group exhibits one (lower)alkyl group, in a position ortho to the hydroxy group and a second (lower)-alkyl group either (a) in the other position ortho to the hydroxy group or (b) in the position meta to the hydroxy group and para to the first (lower) alkyl group. Preferred are the di(lower)alkyl-p-phenolic groups wherein the (lower)alkyl groups are branched groups such as t-butyl. Other arrangements, however, such as for example a 3-t-butyl-6-methyl-p-phenolic group, a 3,5-di-isopropyl-p-phenolic group, or 3,5-dimethyl-p-phenolic group are included.

The integer $x$ can have a value of from 0 to 6, thus embracing substituted phenyl alkanoyl groups wherein the alkylene chain of the alkanoyl portion contains from 2 to 7 carbon atoms (including the carbonyl function) or wherein the carbonyl function is bonded directly to a ring carbon atom. The alkylene chain may be straight or branched, i.e., the substituted phenyl group may be on the carbon atom of the chain most remote from the carbonyl function or on one of the intermediate carbon atoms of the chain. Preferred compounds are those wherein x has a value of 2; e.g., the 3-(dialkyl-4-hydroxyphenyl)propionyl group.

A suitable method for the preparation of the compounds of the present invention involves the treatment of a mercaptan of the formula:

$$R_{4-z}-C[(CH_2)_x-O-\overset{O}{\underset{\|}{C}}-(CH_2)_y-SH]_z$$

wherein R is alkyl or a covalent bond directly connecting the methylene groups (whereby in the latter case C is absent) and $x$ and $y$ are as defined above and $z$ is an integer of 1 to 4, with an equivalent amount of a dialkylhydroxyphenyl alkanoyl chloride, preferably in the presence of an acid binding agent such as pyridine and optionally an inert solvent such as benzene, xylene, toluene or the like. It should become apparent that when $z$ is two, two thioloacyl alkanoic acid ester moieties will be present in the final product. When $z$ has a value of four, correspondingly four of said moieties will be in the product. Typical examples of the above represented mercaptan compounds are: ethylene glycol bis(thioglycolate), ethylene glycol bis(mercaptopropionate), trimethylolpropane tris (thioglycolate), trimethylolpropane tris (mercaptopropionate), pentaerythritol tetrakis (thioglycolate), pentaerythritol tetrakis (mercaptopropionate).

Following are examples illustrating the preparation of alkylhydroxyphenol thioloalkyloxy alkanoic acid esters of this invention.

EXAMPLE I 1,1,1-tris{methylene 3'-[(3",5"-t-butyl-4"-hydroxyphenyl)thiolopropionoxy]-propionate}propane To a soltuion consisting of 5.76 parts of trimethylolpropane tris(mercaptopropionate) in 100 parts by volume of pyridine was added 17.49 parts of 3-(3',5'-di-tert.-butyl-4'-hydroxyphenyl)propionyl chloride portionwise over a two hour period. The reaction mixture was stirred during the addition and for 16 hours thereafter at room temperature, then one hour at 50° C. After cooling, the reaction mixture was poured into 1,000 parts of ice water and the product recovered by extracting with ether. The ether extract was washed with 3 N hydrochloric acid, water and saturated sodium chloride solution. After, drying, 22.10 parts of the product as a waxy solid was obtained. Further purification by means of column chromatography produced the product as a light syrup.

Calculated for $C_{66}H_{98}O_{12}S_3$ (percent): C, 67.20; H, 8.37; S, 8.15. Found (percent): C, 66.97; H, 8.24; S, 8.21.

EXAMPLE II

Tetrabis{methylene 3-[(3',5'-di-t-butyl-4'-hydroxyphenyl)thiolopropionoxy]propionate}methane

EXAMPLE III

Employing the procedure of Example I, 7.81 parts of pentaerythritol tetrakis(mercaptopropionate) in 100 parts by volume of pyridine was reacted with 20.75 parts of 3-(3',5' - di - tert.-butyl - 4' - hydroxyphenyl)propionyl chloride, producing 23.18 parts of the product.

The alkylhydroxyphenylthioacyl alkanoic acid esters of the present invention are stabilizers of organic materials normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide and polycaprolactam; polyesters such as polymethylene terephthalates; polycarbonates; polyacetals;

polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition. A particularly advantageous range for polyolefins such as polypropylene is from about 0.1% to about 1%.

The following examples are to illustrate further the nature of the present invention without introducing any limitations.

EXAMPLE IV

Unstabilized polypropylene powder (Hercules Profax 6501) is thoroughly blended with 0.25% by weight of bis[methylene 3-(3',5'-di-tert.-butyl - 4' - hydroxyphenyl) thiopropionoxy]propionate. The blended material is then milled on a two roller mill at 182° for 10 minutes after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is tested for resistance to accelerated aging in a forced draft oven at 150° C. As is evident from the table below, the composition of 0.25% by weight of a stabilizer and polypropylene is stabilized against oxidative deterioration.

|   | Hrs. |
|---|---|
| Polypropylene (unstabilized) | 3 |
| Polypropylene stabilized with bis[methylene 3-(3', 5'-di-tert.-butyl - 4' - hydroxyphenyl)thiolopropionoxy]propionate | 1395 |

The above procedure was repeated except that 0.1% by weight of said stabilizer was used together with 0.3% by weight of distearylthiodipropionate, a synergist. Polypropylene containing said stabilizing mixture was found to have oven age, under the above conditions, of 145 hours.

EXAMPLE V

Using the procedure described in Example IV, polypropylene was stabilized with 0.25% by weight of 1,1,1-tris{methylene 3''-(3''',5'''-di-tert.-butyl - 4''' - hydroxyphenyl)thiolopropionoxy]-propionate}propane. The oven life was 1300 hours.

Equally good stabilization results are obtained when said compound is added in the amount of 0.1, 0.5 and 1.0% by weight to polyethylene, polypropylene, polybutadiene, polystyrene, butadiene-styrene copolymer, polyvinylchloride and a polyamide.

Example V was repeated except that 0.1% by weight of said stabilizer was used together with 0.3% by weight of distearylthiodipropionate synergyst. The oven life of polypropylene stabilized with this mixture was 810 hours.

EXAMPLE VI

The procedure of Example IV was repeated except that 0.1% by weight of tetrakis{methylene 3[3'(3'',5''-di - tert. - butyl - 4'' - hydroxyphenyl)thiolopropionoxy] propionate}methane was employed in combination with 0.3% by weight of distearylthiodipropionate. The oven life of stabilized polypropylene was 1290 hours.

Similarly good results are obtained when polyisoprene, polyurethane, polymethylene terephthalate, polyacetal and polyethyleneoxide are stabilized with iso-propyl 3-(3',5'-diethyl - 4' - hydroxythiolobenzoate)propionate, bis[methylene(3-methyl - 5 - tert.-butyl-4-hydroxythiolobenzoate)acetate], 1,1,1-tris[methylene 3'-(2'',5''-di-tert.-butyl - 4'' - hydroxythiolobenzoate)propionate]propane, bis[methylene 3-(3',5' - dimethyl - 4' - hydroxyphenyl) thiolopropionoxy acetate], bis[methylene 3-(3',5'-di-tert.-butyl - 4' - hydroxyphenyl)thiolopropionoxy acetate], bis-[pentamethylene 3-(2',5'-di-tert.-butyl-4'-hydroxyphenyl) thioloacetoxy propionate].

EXAMPLE VII

A stabilized mineral oil composition is prepared by incorporating into a refined mineral oil of 183 S.U.S. at 100° F. (Regal Oil B, Texas Company) 0.005% by weight of tetrakis{methylene 3[3'(3'',5'' - di-tert.-butyl-4''-hydroxyphenyl)thiolopropionoxyl]propionate}methane.

EXAMPLE VIII

Stabilized lard is prepared by incorporating in lard 0.01% by weight of 1,1,1-tris{methylene 3'-[3''',5'''-di-tert. - butyl - 4''' - hydroxyphenyl)thiolopropionoxy]-propionate}propane.

Stabilized cotton seed oil is prepared when 0.01% by weight of this stabilizer is incorporated in a refined cotton seed oil.

EXAMPLE IX

Stabilized gasoline is prepared by incorporating into gasoline having no additives and no stabilizers therein 0.05% by weight of bis[methylene 3-(3',5',-di-tert.-butyl-4'-hydroxyphenyl)-thiolopropionoxy]propionate.

EXAMPLE X

Paraffin wax (M.P. 125–128° F.) is stabilized by incorporating therein 0.001% by weight of tetrakis{methylene 3-[3'(3'',5''-di - tert.-butyl-4''-hydroxyphenyl)-thiolopropionoxy]propionate}methane.

EXAMPLE XI

A stabilized high temperature lubricating oil is prepared by incorporating 2% by weight of methyl 3-(3',5'-di-tert.-butyl-4'-hydroxythiolobenzoate)propionate into the lubricant, which comprises diisoamyladipate.

EXAMPLE XII

High impact polystyrene resin containing elastomer (i.e., butadiene-styrene) is stabilized against loss of elongation properties by incorporation of 0.5% by weight of n-dodecyl 3,5 - di - tert.-butyl-4-hydroxythiolobenzoate acetate.

EXAMPLE XIII

A mixture of 1 kilogram of polyoxymethylene diacetate (molecular weight of about 30,000), 5 g. of 1,1,1-tris-{[methylene 3'-(3'',5''-di-isopropyl-4'' - hydroxyphenyl) thiolopropionoxyl]acetone}propane and 2 g. of dicyandiamide are extruded at 220° C. to yield a stabilized product.

EXAMPLE XIV

A mixture of 1 M nylon 6,6 salt (hexamethylene diamine adipate) 0.01 M hexamethylene diamine and 1% by weight of tetrakis{[methylene 3-(3',5'-di-tert.-butyl-4'-hydroxyphenyl)thiolopropionoxy]acetate}methane are added to a polymerization tube and heated for one hour at 220° C. and atmospheric pressure. The temperature is then raised to 285° C. and the pressure reduced slowly to 1 mm. The tube is maintained under these conditions for 30 minutes, cooled and flushed with nitrogen.

The thus stabilized polyhexamethylene adipate shows less color development and weight loss than does an unstabilized sample.

What is claimed is:
1. A compound of the formula:

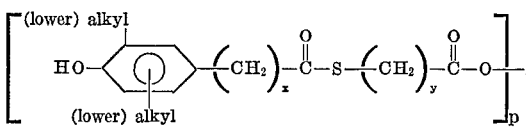

wherein
x has a value of from 0 to 6;
y has a value of from 1 to 6;
p has a value of from 1 to 4;
A is an alkyl or an alkylene group having from 1 to about 12 carbon atoms.

2. A compound according to claim 1 wherein said compound is of the formula:

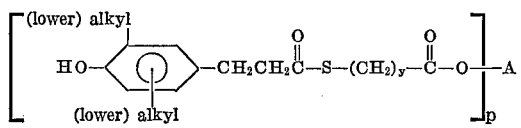

3. A compound according to claim 1 wherein said compound is of the formula:

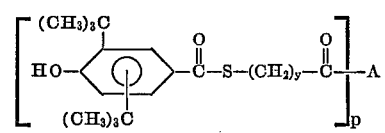

4. A compound according to claim 2 wherein said compound is of the formula:

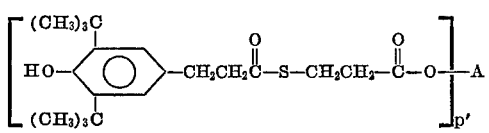

wherein $p'$ has a value of 2 to 4.

5. A compound according to claim 3 wherein said compound is of the formula:

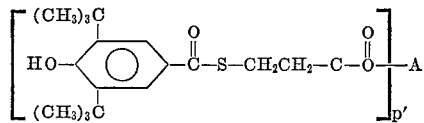

wherein $p'$ has a value of 2 to 4.

6. The compound according to claim 4 wherein $p'$ is 2 and A is ethylene group, —$CH_2CH_2$—.

7. The compound according to claim 4 wherein $p'$ is 3 and A is 2,2-di-methylenebutyl group,

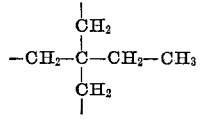

8. The compound according to claim 4 wherein $p'$ is 4 and A is tetramethylenemethane group,

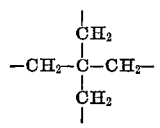

References Cited

UNITED STATES PATENTS 2,408,095  9/1946  Peppel _____ 260—455
3,441,575  4/1969  Dexter et al. _____ 260—399

FOREIGN PATENTS 42-6332  3/1967  Japan _____ 260—455C

LEWIS GOTTS, Primary Examiner
D. G. RIVERS, Assistant Examiner

U.S. Cl. X.R.

260—45.85, 398.5, 666.5; 252—48.6, 404; 44—70